April 28, 1964
L. F. DE FARO
3,130,636
PHOTOCOPY UNIT
Filed Sept. 19, 1962
3 Sheets-Sheet 1
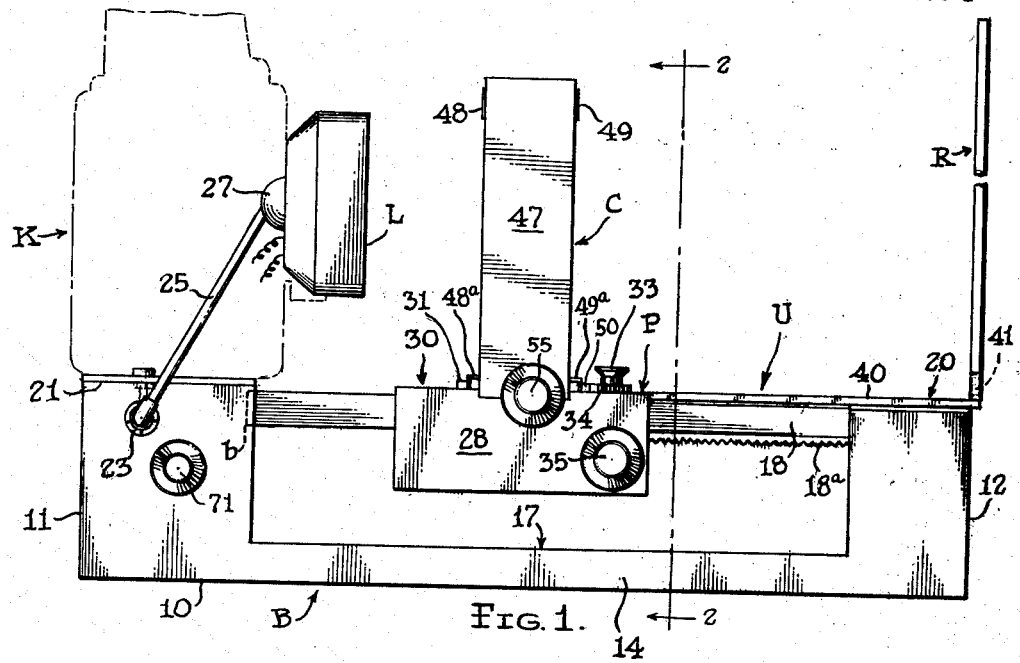
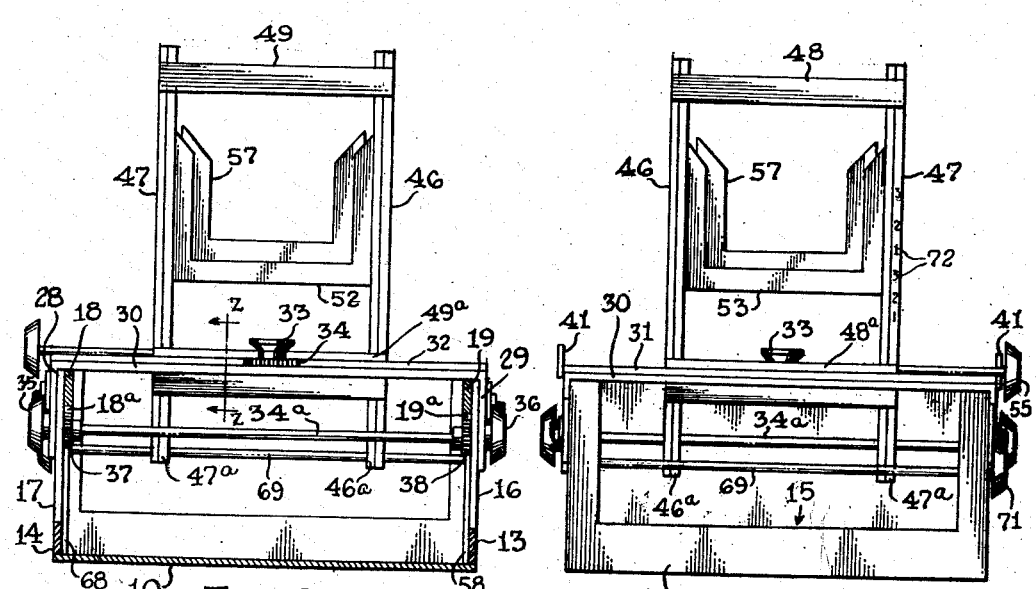
INVENTOR
LUIZ FLAVIO DE FARO

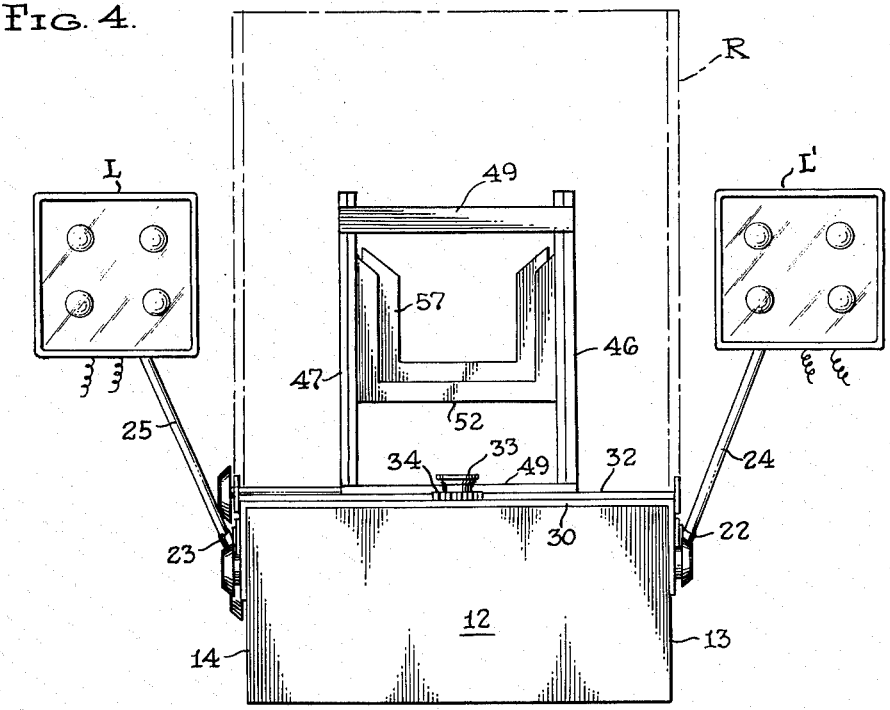
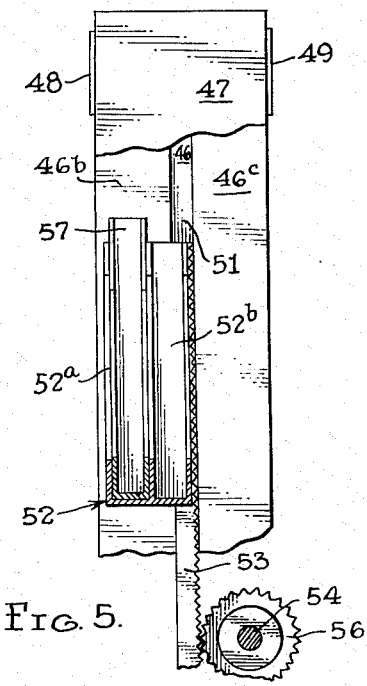
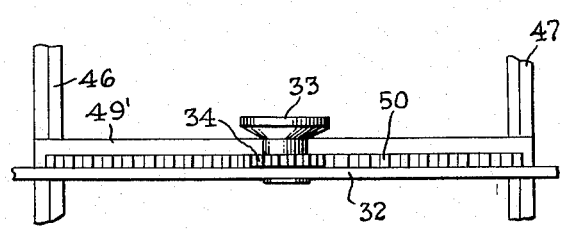
Fig. 4.
Fig. 5.
Fig. 6.
INVENTOR
LUIZ FLAVIO DE FARO April 28, 1964
L. F. DE FARO
3,130,636
PHOTOCOPY UNIT
Filed Sept. 19, 1962
3 Sheets-Sheet 3
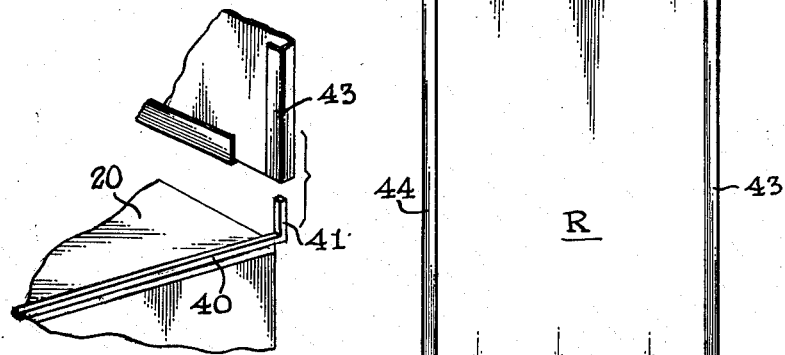
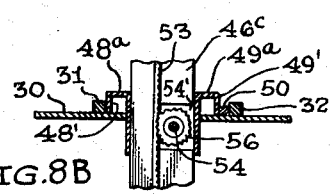
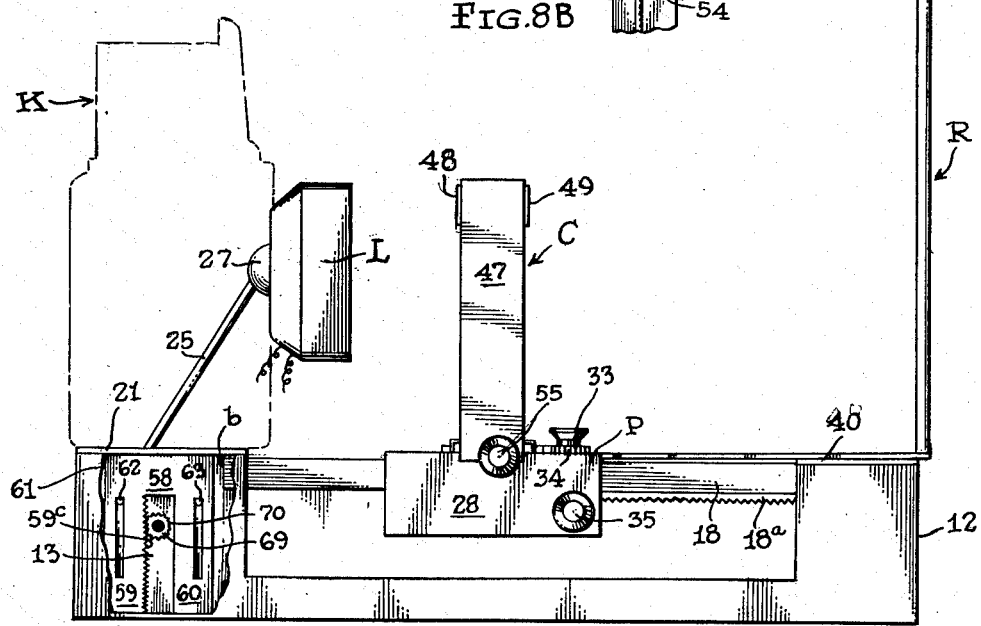
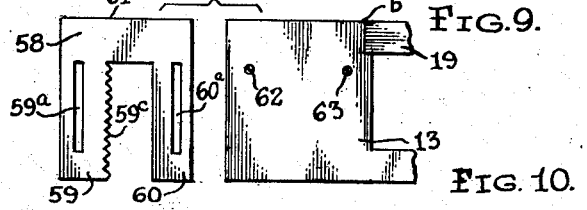
INVENTOR
LUIZ FLAVIO DE FARO __PREFIX__
3,130,636
PHOTOCOPY UNIT
Luiz Flavio de Faro, Arlington, Va., assignor to Faroscope Manufacturing Company, Silver Spring, Md., a corporation of Maryland
Filed Sept. 19, 1962, Ser. No. 224,741
10 Claims. (Cl. 88—24)

The instant invention relates to a photocopy unit and more particularly to such a unit which is portable, light, compact, easily assembled and disassembled; which may be manufactured at relatively low cost and which will be especially attractive to amateur photographers for use in the home, though by no means limited thereto.

A primary object of the invention is the making of a portable photocopy device of the type described in the aforementioned paragraph which may be employed, among other uses, to perform the following operations: copying of slides, negatives and small prints; photographing of small objects at close range; correction of color exposure in defective slides; making of negatives from slides for better color printing; making of color slides from color negatives; correcting of exposure in black and white negatives; making of black and white negatives from color or black and white slides; making of black and white slides from color and black and white negatives; enlarging of slides or negatives or sections of the same and similar procedures.

Yet another aim is the construction of a photocopy unit capable of expeditiously effecting the various operations set out in the paragraph above, yet which is of simple construction, easy to use and which possesses great versatility.

The above and other aims and objects will be apparent from the detailed description hereinafter appearing when taken in conjunction with the appended drawings forming a part hereof to which attention is now directed and in which FIG. 1 is a side elevational view of the photocopy unit showing in dotted outline a removable copying camera in operative position on the unit.

FIG. 2 is a sectional view taken on line 2—2 of FIG. 1 looking in the direction of the arrows.

FIG. 3 is a front elevational view of the unit with the copying camera and lamps removed.

FIG. 4 is a front elevational view looking to the left in FIG. 1 with the combined reflector and photo-holder shown in dotted lines.

FIG. 5 is an enlarged fragmentary view, partly in section, of the slide or negative carrier showing means for vertical adjustment thereof.

FIG. 6 is a fragmentary view of the lateral adjusting means for the slide carrier.

FIG. 7 is another fragmentary view, in perspective, showing the means for removably mounting the combined reflector and photo-holder.

FIG. 8 is a front elevational view of the combined reflector and photo-holder.

FIG. 8A is a bottom edge view of the combined reflector and photo-holder.

FIG. 8B is a section on line Z—Z of FIG. 2.

FIG. 9 is an elevational view, similar to FIG. 1, but partly broken away, to show one of a dual means for vertically adjusting the copying camera with respect to the slide or negative carrier; and FIG. 10 is an exploded fragmentary view of one of the adjusting means referred to in FIG. 9.

Turning first to FIGS. 1, 2 and 3, the unit is designated in its entirety as U and comprises a substantially rectangular box-like base or support B having a bottom wall 10, a front wall 11, a back wall 12, and connecting side walls 13 and 14. It will be noted that front wall 11 is cut away as at 15 to provide a substantially rectangular opening therein and that each of side walls 13 and 14 is similarly cut away at 16, 17, respectively. A guide rail 18, which may be rectangular in cross-section, and having a gear rack 18a on its bottom surface, is secured to wall 14 internally adjacent the top edge thereof and as shown the rail extends the length of the base longitudinally thereof from a point b on the wall 14 to back wall 12. A guide rail 19 having a gear rack 19a, similar in all respects to rail 18 and rack 18a, is fastened to wall 13, spaced rails 18 and 19 constituting a trackway for a basic platform P, detachably mounting a slide, negative or small print carrier C, all to be described more in detail hereinafter. A laterally extending, plate-like member 20 is secured to the upper portion of the rails 18 and 19 and walls 12, 13 and 14, and a similar plate 21, of somewhat greater area, is also positioned transversely of the rails adjacent the wall 11, but for vertically adjustable movement of a copying camera K, removably attached thereto in any convenient manner, the camera being shown in dotted lines in FIGS. 1 and 9. Side walls 13 and 14, adjacent front wall 11, each has a socket 22 and 23, respectively, detachably receiving a rod 24 or 25, respectively, terminating in ball and socket joints 26 and 27, respectively, which joints respectively support a reflector equipped electric lamp L, L'. It will be understood that each ball and socket joint 26 or 27 permits relative movement and adjustment of a light source or lamp with respect to the aforementioned carrier C, and the combined reflector and copy-holder R.

Basic platform P comprises an inverted U-shaped member straddling rack rails or guides 18, 18a, and 19, 19a, said platform including side walls 28 and 29 and a horizontal top wall 30 cut away to provide opposed trackways 31 and 32 centrally thereof, the latter trackway having adjusting knob 33 carrying a pinion 34 partially overlying the trackway for a purpose which will shortly appear. Extending transversely of and carried by side walls 28 and 29 of the platform P is a shaft 34a, said shaft being rotatably journalled in said walls below guide rack rails 18, 18a and 19, 19a, the shaft terminating in fixed adjusting knobs 35 and 36 exteriorly of said rack rails. Fixed to shaft 34a, for rotation therewith, are spaced pinions 37 and 38 in meshing engagement with respective racks 18a and 19a. An arm 40 is rigidly fastened to wall 28 of the platform P and extends rearwardly therefrom, longitudinally of the base B beyond rear wall 12, said arm 40 terminating in a short vertical leg 41, FIG. 7. A similar construction (not shown) is attached to parallel wall 29. The combined metallic reflector and copy-holder R having inturned side edge channel members 43 and 44 and a partial bottom channel 45, is shown in FIGS. 7, 8 and 8A, the channels 43 and 44 cooperating with vertical legs 41 for detachably carrying the holder R, said channels also selectively serving to receive a photo, drawing, printed page or the like which it may be desired to copy. From the description thus far, it will be understood that rotation of either knob 35 or 36 will produce longitudinal movement either forwards or backwards of platform P, together with reflector and copy-holder R relative to camera K. Racks 18a and 19a and pinions 37 and 38 preferably have closely spaced teeth for producing a very fine adjustment.

Slide, negative or small print carrier C comprises a pair of spaced parallel vertical walls 46 and 47 having front and rear transverse connecting straps 48 and 49 adjacent the upper ends thereof. As will be seen—FIGS. 2 and 3—the vertical walls 46 and 47 project below the horizontal level of trackways 18 and 19 as indicated at 46a and 47a. As shown in FIG. 8B, a second pair of opposed transverse straps 48a and 49a are fastened in any convenient manner to the walls 46 and 47 at the level of trackways 31 and 32, strap 48a having a lip 48' extending forwardly and then downwardly constituting an inverted L which fits into track 31 for contracting relative movement with respect thereto as will be apparent. Similarly, strap 49a has a lip 49' extending rearwardly and downwardly, the latter having transverse gear rack 50 on its exposed face, the strap 49a and gear rack 50 fitting into track 32, with said rack in meshing engagement with pinion 34 of knob 33, see FIG. 6. Rack 50 and pinion 34 have their respective teeth closely spaced and it will now be seen that rotation of knob 33 either clockwise or counterclockwise will produce a lateral movement of of carrier C with respect to camera K, for a fine lateral adjustment; also that said carrier may be readily removed from tracks 31 and 32 by merely lifting same upwardly; and conversely inserted into operative position by placing same onto tracks 31 and 32 with the teeth of rack 50 meshing with the teeth of pinion 34.

Referring now to FIGS. 2, 3 and 5, it will be noted that wall 46 is of double thickness, said wall 46 having a pair of opposed vertically extending internal wall members 46b, 46c spaced to form a centrally positioned vertical groove 51. Wall 47, although not internally shown, is similarly constructed.

A U-shaped slide, negative or small print elevator 52 is equipped with abutting internal U-shaped grooved trackways 52a and 52b. It will be noted, by reference to FIG. 5, that that portion of elevator 52 carrying grooved trackway 52a is in abutting relationship with internal wall member 46b; while that portion of elevator 52 carrying grooved trackway 52b overlaps vertical groove 51. Fixed to an external face of elevator 52 is a gear rack 53 fitting within groove 51, said rack being of a width to permit close guiding upward and downward movement of the rack and elevator in a manner now to be described.

A transverse shaft 54 terminating in an external knob 55 is journalled in walls 46 and 47 of carrier C intermediate straps 48a and 49a. Pinion 56 is fixed to shaft 54 for rotation therewith, said pinion being preferably in a cut-out portion 54' of wall member 46c, FIG. 8B. Pinion 56 is in meshing engagement with rack 53 and as both are provided with closely spaced teeth it will be seen that clockwise rotation of knob 55 will raise elevator 52 for vertical guided movement upwardly in groove 51 and a corresponding groove in wall 47, and counterclockwise rotation of the knob will produce downward movement for fine vertical adjustment of elevator 52 with respect to camera K. Adapted to be inserted into the grooved trackways 52a, 52b of the elevator by dropping same downwardly into position between straps 48 and 49, is a complementarily U-shaped slide, negative or small print mount 57, and as will be understood by those skilled in the art such a mount may be of a size to hold slides, negatives or prints of varying dimensions. While one of the grooved trackways 52a holds such a mount, the other trackway 52b may hold a filter or screen, where such is desired.

As previously mentioned, plate or rest 21, FIGS. 9 and 10, has a copying camera K removably mounted thereon. Means are provided for vertical movement of the rest 21 comprising a plate-like member 58 of inverted U-shaped configuration having spaced legs 59 and 60 each provided with a vertical slot 59a and 60a, respectively. Leg 59 further has a toothed rack 59c, the upper horizontal edge 61 of member 58 being welded or otherwise secured to the bottom of rest 21. Wall 13 of the unit U has a pair of internally spaced projecting pins 62 and 63 riding in respective slots 59a and 60a. A structurally similar plate-like member 68 is provided for wall 14, said plate also welded or otherwise secured to the bottom of camera rest 21. It is also within the purview of the invention to make rest 21 and plate members 58 and 68 structurally integral thus forming a unitary inverted U-shaped support.

Journalled in walls 13 and 14 to extend transversely therethrough, is a rotatable shaft 69 having a pinion 70 fixed thereto for meshing engagement with rack 59c, said shaft terminating in a fixed external knob 71. A similar pinion and rack structure is provided for plate 68. By equipping the rack 59c and pinion 70 with closely spaced teeth, a very fine vertical adjustment of the camera K with respect to the slide, negative or print carrier C or reflector R, is achieved.

It will be noted that carrier C has numerals 72 on the front face and adjacent an edge thereof. These are employed for parallax correction when a twin lens reflex camera is used as the copying camera K. The upper lens, of the twin lenses, serves to obtain proper focus and framing of the subject slide, negative or small print. Assuming that this proper focus and framing is attained when the lower edge of mount 52 is aligned with upper numeral 2, then the mount is lowered by counter-clockwise rotation of knob 55 until the lower edge is aligned with lower numeral 2. Picture is now ready to be snapped through the lower lens.

Specific uses of the copying unit U other than those set out in the second paragraph of column 1 will be apparent to those skilled in the art. Also it will now be seen that the unit may be readily assembled and disassembled by removing the copying camera K from rest 21 and removing carrier C from platform P; also reflector R from supports 40–41.

Various changes may be made in specific details described and it is contemplated to cover all such and to be limited in this respect only as may be necessary by the scope of the claims hereto appended.

What I claim and desire to secure by Letters Patent is:

1. A photocopy unit comprising a base, a rest at one end of the base for supporting a camera, a platform on the base, means for moving said platform longitudinally of the base relative to said camera, a carrier for matter to be copied mounted on said platform, and means for moving said carrier relative to said platform, the means for moving said platform comprising spaced longitudinally extending gear-rack-equipped trackways on the base, and rotatable pinions carried by the platform meshing with said gear-rack-equipped trackways.

2. The structure of claim 1, said platform having an upwardly opening U-shaped trackway and rack and pinion means on the platform and on the carrier for moving the latter transversely of the former on said last mentioned trackway.

3. The structure of claim 1, said platform having an upwardly opening U-shaped trackway, rack and pinion means on the platform and on the carrier for moving the latter transversely of the former on said last mentioned trackway, a mount positioned on the carrier, and means for moving said mount vertically on said carrier.

4. A photocopy unit comprising a base, a rest at one end of the base for supporting a camera, a platform on the base, means for moving the platform longitudinally of the base relative to said rest, a combined reflector and picture holder fixed to said platform for movement therewith, a carrier positioned on said platform, means for moving said carrier transversely thereon, a slide mount forming part of said carrier and means for vertically moving said mount relative thereto.

5. The structure of claim 4, and means for vertically adjusting said rest relative to said base.

6. The structure of claim 4, the means for moving said carrier transversely of said platform comprising a transverse trackway on said platform, and meshing gear means on the transverse trackway and on the carrier operable to produce said transverse movement of the carrier on the trackway.

7. The structure of claim 4, the means for vertically moving said mount relative to said carrier comprising a vertical gear rack carried by the mount, said carrier having a vertical groove, said rack movable in said groove, and a rotatable pinion on said carrier meshing with said gear rack.

8. The structure of claim 4 further including light means mounted on the base adjacent the rest.

9. The structure of claim 5, wherein the vertically adjusting means comprises spaced racks fixed to the rest and spaced pinions meshing with the racks.

10. A photocopy unit comprising a base, a rest at one end of the base for supporting a camera, a platform on the base, means for moving the platform longitudinally of the base relative to said camera, said platform having a transverse and upwardly opening U-shaped trackway, a carrier for matter to be copied mounted in said trackway, and means on the carrier and platform for moving the carrier along said trackway.

References Cited in the file of this patent
UNITED STATES PATENTS

| | | |
|---|---|---|
| 1,603,882 | Twining et al. | Oct. 19, 1926 |
| 1,845,294 | La Grande | Feb. 16, 1932 |
| 2,408,247 | Wekeman | Sept. 24, 1946 |
| 2,505,990 | Pollock | May 2, 1950 |